United States Patent [19]

Csanady

[11] Patent Number: 4,830,196

[45] Date of Patent: May 16, 1989

[54] BICYCLE SUPPORT RACK

[76] Inventor: Dezso Csanady, 404 Wilmette Ave., Glenview, Ill. 60025

[21] Appl. No.: 163,743

[22] Filed: Mar. 3, 1988

[51] Int. Cl.[4] .............................................. A47F 7/04
[52] U.S. Cl. .................................... 211/19; 248/302; 248/DIG. 11
[58] Field of Search ...................... 248/201, 302, 309.1, 248/DIG. 11; 224/42.03 B; 211/17–23

[56] References Cited

U.S. PATENT DOCUMENTS

| | | | |
|---|---|---|---|
| 562,669 | 6/1896 | Smart | 211/20 |
| 616,749 | 12/1988 | Thurston | 211/19 |
| 621,819 | 3/1899 | Ivatt | 211/17 |
| 625,657 | 5/1899 | Elliott | 211/19 |
| 672,070 | 4/1901 | Smith | 211/19 |
| 2,639,813 | 5/1953 | Risvold | 211/19 |
| 2,920,853 | 1/1960 | Bufogle | 248/287 |
| 4,063,647 | 12/1977 | Blackmore | 211/19 |
| 4,141,524 | 2/1979 | Corvese | 248/231.4 |
| 4,392,572 | 7/1983 | Bernard | 248/339 |
| 4,465,196 | 8/1984 | Erb | 211/19 |
| 4,629,104 | 12/1986 | Jacquet | 211/17 |

FOREIGN PATENT DOCUMENTS

| | | | |
|---|---|---|---|
| 179205 | 7/1954 | Austria | 211/18 |
| 910990 | 4/1954 | Fed. Rep. of Germany | 211/20 |
| 1225513 | 9/1966 | Fed. Rep. of Germany | 211/19 |
| 3320369 | 12/1984 | Fed. Rep. of Germany | 211/19 |
| 415343 | 9/1910 | France | 211/22 |
| 305925 | 5/1955 | Switzerland | 211/20 |
| 24427 | of 1897 | United Kingdom | 211/18 |

*Primary Examiner*—Alvin C. Chin-Shue
*Assistant Examiner*—Robert A. Olson
*Attorney, Agent, or Firm*—Jerome Goldberg

[57] ABSTRACT

A bicycle support rack includes an upper bracket secured to a wall or upright for supporting the front wheel of the bicycle and a lower bracket located below the upper bracket and also secured to the wall for supporting the rear wheel of the bicycle. Each bracket has a first mounting position for supporting the bicycle in a vertical position perpendicular to the wall and a second mounting position for supporting the bicycle in a vertical position angled less than 90 degrees from the wall. The upper bracket may be adjustable for accommodating the various bicycle wheel sizes.

15 Claims, 2 Drawing Sheets

1

BICYCLE SUPPORT RACK

BACKGROUND OF THE INVENTION

This invention relates generally to a rack for storing bicycles, and more particularly relates to a rack for supporting bicycles in a vertical position along a vertical wall or upright.

Various racks have been devised in the past for storing bicycles in a vertical plane, along its longitudinal axis and suspended from a vertical wall or upright. In U.S. Pat. No. 627,070 bicycles are stored vertically so that the front wheels thereof are inclined to a vertical wall and the rear wheels are below the front wheels and positioned substantially perpendicular to the wall. The front wheel of the bicycle is supported by a double hook configuration bent from a single piece of heavy wire.

Another arrangement for vertically storing bicycles is disclosed in U.S. Pat. No. 4,392,572. The front wheel of the bicycle is positioned in a channel member and supported by the front wheel abutting an arcuate strip. The rear wheel contacts the wall or a protective pad attached to the wall. In both of the aforementioned prior bicycle storage racks, the bicycle is supported by the front wheel being in an abutting contact with a support or bearing member projecting outward from the wall.

In the present invention, a bicycle support rack is provided which enables the bicycle to be supported along its longitudinal axis, in a vertical plane substantially perpendicular to the wall or inclined from the wall. Moreover, the storage rack herein is adjustable to enable bicycles of various wheel sizes to be supported vertically on the rack.

Therefore, a primary object of this invention is to provide a bicycle support rack for storing a bicycle along its longitudinal axis in a vertical plane suspended from a vertical wall.

Another object is to provide a bicycle support rack for storing bicycles perpendicular to a vertical wall or inclined to the wall.

Another object is to provide an adjustable side support for accommodating various sized bicycle wheels.

A primary feature of the invention is to provide a bicycle support rack having an upper bracket suspended from a vertical wall for supporting the front wheel, and a lower bracket also suspended from the vertical wall for supporting the rear wheel, and each of the brackets including a first mounting position for supporting the the corresponding wheel of the bicycle perpendicular to the wall, and a second mounting position for supporting the corresponding wheel of the bicycle inclined from the wall.

SUMMARY OF THE INVENTION

The bicycle support rack of the present invention supports a bicycle in a vertical position suspended from a vertical wall. The support rack may be mounted so that the bicycle is supported substantially perpendicular to the wall, or angled from the wall. The support rack includes an upper bracket for supporting the front wheel and a lower bracket for supporting the rear wheel. Each of the brackets has a first mounting position and a second mounting position, for varying the angles of the corresponding wheel with respect to the vertical wall. The upper bracket includes a forward bearing member for contacting the rim of the front wheel and an adjustable side support to enable storage of bicycles having various wheel sizes.

BRIEF DESCRIPTION OF THE DRAWINGS

Referring to the drawings in which the same characters of references are employed to indicate corresponding similar parts throughout the several Figures of the drawing.

DESCRIPTION OF THE PREFERRED EMBODIMENT

Figure 7:
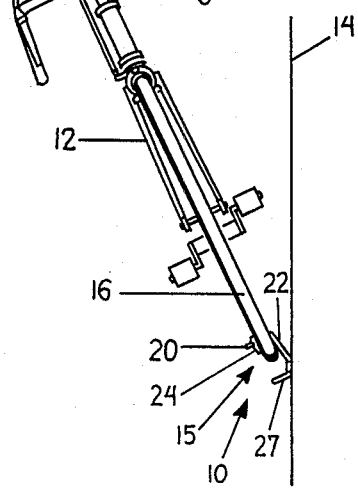
FIG. 7 is a top view showing the bicycle angularly supported from the vertical wall.

Referring now to FIGS. 1,4,7 and 11, the reference numeral 10 indicates generally a bicycle support rack for vertically supporting a bicycle 12 to a wall or upright 14. The rack 10 may be used to support the bicycle in a vertical position perpendicular to the wall 14 (FIG. 4) or in a vertical position inclined to the wall (FIG. 7). The support rack 10 includes a top front wheel bracket 15 (FIG. 2) for engaging the front wheel 16, and a bottom rear wheel bracket 17 (FIG. 3), for engaging the rear wheel 18.

Turning now more specifically to FIGS. 2,5,8 and 11, it will be seen that the front wheel bracket 15 includes a forward bearing rod means 20, an upper side bar 22 spaced above a lower side bar 23, and an adjustable side member 24 (FIG. 10) laterally spaced from the upper and lower side bars 22,23. The adjustable side member 24 is perpendicular to the bearing rod means 20. Connecting means 25,25' integrally connect respectively the upper and lower side bars 22,23 to the bearing rod means 20, which is positioned vertically between the upper side bar 22 and the lower side bar 23.

The adjustable side member 24 is movable along the bearing rod means 20 for accommodating the various bicycle wheel sizes between the side bars 22,23 and the adjustable side member 24. When the front wheel 16 is supported in the top bracket 15, the bicycle 12 tends to be pulled downward and to rotate counterclockwise. Hence, the rim 26 of the front wheel 16 abuts the inner side 27 of the bearing rod means 20.

The top front wheel bracket 15 further includes a first upper mounting member 28 and a first lower mounting member 29 for attaching the front wheel bracket 15 to the wall 14 in a first mounting position, for supporting the front wheel 16 perpendicular to the wall 14. The first mounting members 28,29 are substantially parallel to the forward rod means 20. When the first upper and lower mounting members 28,29 are secured to the wall 14, the forward rod means 20 is substantially parallel to the wall 14.

A second upper mounting member 30 and a second lower mounting member 32 may be used for attaching the front wheel bracket 15 to the wall in a second mounting position, for supporting the front wheel 16 angularly from the wall 14. The second upper mounting member 30 is obliquely and integrally attached at one end to the first member mounting member 28 and obliquely and integrally attached at the opposite end to the upper side bar 22.

Figure 8:
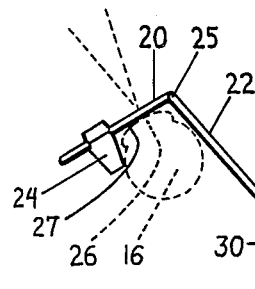
FIG. 8 is a top view of the top front wheel bracket mounted to the vertical wall, for supporting the bicycle angularly from the wall as illustrated in FIG. 7, and showing the front wheel and rim in phantom inside the upper bracket.
Figure 9:
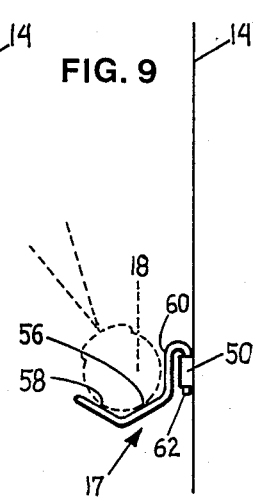
FIG. 9 is a top view of the bottom rear wheel bracket used with the bracket in FIG. 8, and showing the rear wheel in phantom inside the bottom bracket.

Similarly, the second lower mounting member 32 is obliquely and integrally attached at one end to the first lower mounting member 29 and obliquely and integrally attached at the opposite end to the lower side bar 23. When the second upper and lower mounting members 30,32 are secured to the wall 14, the forward rod means 20 and the upper and lower side bars 22,23 and the adjustable side member 24 are inclined with respect to the wall at an angle less than ninety degrees. Therefore, in the second mounting position for the upper bracket 15, the front wheel 16 is supported in a vertical position obliquely from the wall (FIG. 8).

Figure 1:
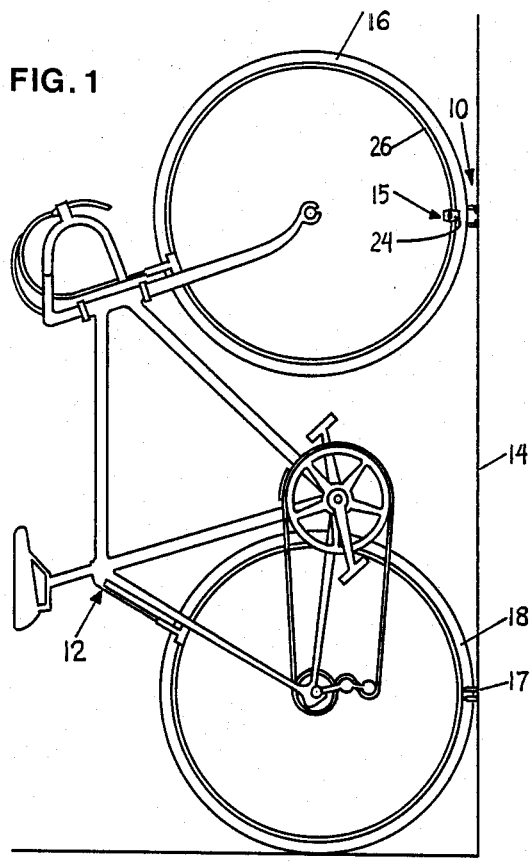
FIG. 1 is a side elevational view illustrating a bicycle vertically positioned along its longitudinal axis and supported on a bicycle support rack mounted to a vertical wall, and embodying the principles of the invention.
Figure 2:
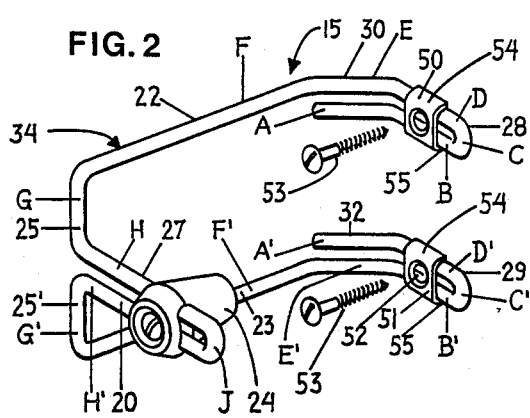
FIG. 2 is a front perspective view of the upper front wheel bracket of the bicycle support rack.
Figure 11:
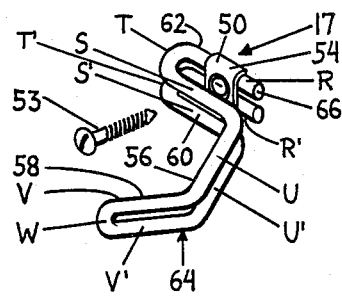
FIG. 11 is a side perspective view of the top front wheel bracket spaced above the bottom rear wheel bracket of the bicycle support rack.

As may be seen from FIGS. 2 and 11, the forward bearing rod means 20, the upper and lower side bars 22,23, the first upper and first lower mounting members 28,29, and the second upper and second lower mounting members 30,32 are formed from a single wire indicated generally by the reference numeral 34.

Referring now specifically to FIGS. 2 and 11, an end section A of the wire 34 is angled approximately 60 degrees with respect to a plane normal to the wall 14. A loop is formed in the wire 34 after section A to provide an elbow C between a section B and a section D spaced above in alignment with section B and parallel to and having the same length as section B. The section B is bent from section A to provide an angle of approximately 120 degrees therewith. Section E is bent from section D to provide an angle of approximately 120 degrees with section D, and section E is spaced above in alignment with section A and parallel to and having the same length as section A. A section F forms the upper side bar 20 and is angled approximately 120 degrees from section E. A section G is bent perpendicularly downward from the outer end of section F. A loop is again formed in the wire 34 at the outer or lower end of section G to provide an elbow J between section H and section H' spaced below and in alignment with section H and parallel to and having the same length as section H. Section H is bent approximately 105 degrees from the lower end of section G.

A section G' is bent downward perpendicular to section H' and having the same length as section G and in substantial alignment therewith. A section F' is bent from the outer or lower end of section G' and has the same length as section F to form the lower side bar 23, which is spaced from and in substantial alignment with section F (bar 22). A section E' is angled approximately 120 degrees from section F'.

The wire 34 is again looped to provide an elbow C' joining a section D' with a section B' spaced below in alignment with section D' and is parallel to and has the same length as section D'. A section A' is bent from the outer end of section B' at an angle of approximately 120 degrees. Section A' is spaced above, parallel to and has the same length as section E'.

From the foregoing, it is seen that the part of the wire 34 from section A to elbow J is substantially the same as the remaining part of the wire from the elbow J to Section A'. The forward bearing rod means 20 includes section H spaced above section H'; the first upper mounting member 28 includes section D spaced above section B; the first lower mounting member 29 includes section D' spaced below section B'; the second upper mounting member 30 includes section E spaced above section A; and the second lower mounting member 32 includes section E' spaced below section A'.

Figure 10:
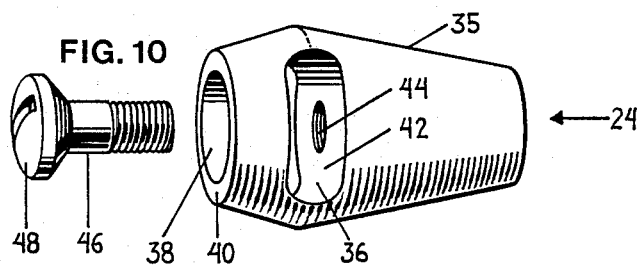
FIG. 10 is a perspective view of the adjustable side member of the top front wheel bracket of the storage rack.

As may be seen from FIG. 10, the adjustable side member 24 includes a tubular body 35 having a lateral side opening 36 extending through. A hole 38 is formed inward from the forward or outer end 40 of the side member 24 and communicates with the lateral opening 36. An inner wall 42 is spaced from the outer end 40 and includes a threaded aperture 44 formed inward from the wall 42 and in communication with the lateral opening 36.

The lateral opening 36 receives the spaced apart wire sections H and H' of the forward bearing rod means 20, to permit the adjustable side member 24 to slide along sections H and H' and provide the desired lateral distance between the upper and lower side bars 22,23 and the side member 24, to accommodate the various bicycle wheel sizes. When the location for the adjustable side member 20 is selected, a screw 46 is passed through the forward end hole 38 of side member 24, and through the space between sections H and H' and inside the opening 36 to engage the threaded aperture 44. The screw 46 is rotated so that the head 48 of the screw tightly abuts the forward or outer side of sections H and H' of the bearing rod member 20.

Channel members 50, each having a central opening 52, are used with screws 53 (wood type) to attach the mounting members 28,29,30 and 32 to the vertical wall 14. The channel member 50 is dimensioned to slide either along the first mounting members 28,29 or the second mounting members 30,32.

The channel member 50 includes an upper gripper 54 and a lower gripper 55 for contacting the top and bottom edges of the corresponding mounting members 28,29,30, and 32. The central opening 52 of channel member 50 aligns with the spacing between wire sections B and D of the first upper mounting member 28 and the central opening 52 of another channel member 50 aligns with the spacing between sections B' and D' of the first lower mounting member 29, when the bracket 15 is secured to the wall in the first mounting position to support the bicycle perpendicular to the wall.

Similarly, the central opening 52 of the channel member 50 aligns with the spacing between wire sections E and A of the second upper mounting member 30 and another channel member 50 aligns with the spacing between section E' and A' of the second lower mounting member 32, when the bracket 15 is secured to the wall 14 in the second mounting position to support the bicycle angularly from the wall. The screw 53 extends through the opening 52 and the spacing of the corresponding mounting member for attachment to the wall.

Referring now to FIGS. 3, 6, 9 and 11, the bottom rear wheel bracket 17 is shown comprising a contact rod means 56, a first side support 58, and a second side support 60, and mounting member 62 integrally formed to the side support 60. When mounting the rear wheel bracket 17 to correspond to the mounting of the top front wheel bracket 15 for providing vertical storage of the bicycle 12 perpendicular to the wall 14, the contact rod means 56 is also utilized for mounting the rear bracket 17 to the wall 14. When mounting the rear wheel bracket 17 to correspond to the front wheel bracket 15, for providing vertical storage of the bicycle obliquely or angularly from the wall, the mounting member 62 is used.

Figure 3:
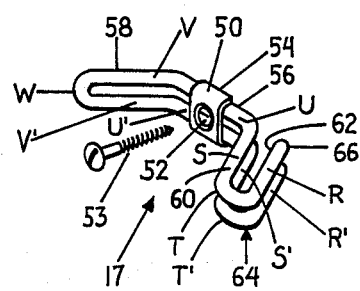
FIG. 3 is a perspective view of the lower rear wheel bracket of the bicycle support rack.

As may be seen from FIGS. 3 and 11, the contact rod means 56, the first side support 58, the second side support 60, and the mounting member 62 of the rear wheel bracket 17 are constructed from a single wire 64. One end 66 of the wire 64 is looped to provide end section R and section S linked together by elbow T. Sections R and S are laterally spaced apart, parallel to each other and have the same length. A section U is bent from section S approximately 120 degrees.

The wire 64 is again looped to provide an elbow W between a section V and a section V'. The section V is vertically spaced above and aligned with section V' and is parallel to and has the same length as section V'. Section V is angled from section U approximately 120 degrees. A section U' is angled from a section V' and section V' is vertically spaced below, parallel to and has the same length as section U. The wire 64 is further looped to provide a section S' and R' connected together by an elbow T'. Section S' is vertically spaced below and aligned with section S, and is parallel to and has the same length as section S. Similarly, section R' is vertically spaced below and aligned with section S, and is parallel to and has the same length as section R. From the foregoing it is seen that the part of the wire 64 from section R to elbow W is substantially the same as the remaining part of the wire from elbow W to section R'. The contact rod means 56 of the bottom rear wheel bracket 17 includes section U spaced above section U'; the first side support 58 includes section V spaced above section V' and side support 60 includes section S spaced above section S' and the mounting member 62 includes the section R spaced above section R'.

When attaching the bottom rear wheel bracket 17 to the wall 14 in its first mounting position for supporting the rear wheel 18 perpendicular to the wall, the channel member 50 is positioned on the contact rod means 56 so that the opening 52 aligns with the spacing between sections U and U'. The screw 53 extends through opening 52 and the space between sections U, U' and is attached to the wall 14.

Similarly when attaching the bottom rear wheel bracket 17 to the wall 14 in its second mounting position for supporting the rear wheel 18 angularly from the wall, the channel member 50 is positioned on the mounting member 62 so that the opening 52 aligns with the space between section R and section R'. The screw 53 extends through opening 52 and the space between sections R and R' and is attached to the wall 14.

The first side support 58 and the second side support 60 flair outward from each other, so that the distance therebetween increases as the side supports extend away from the contact rod means 56. Various sized rear wheels are positioned in the same rear wheel bracket 17. The larger rear wheels 18 would be sandwiched between the side supports 58, 60 and not in contact with the contact rod means 56.

When the top front wheel bracket 15 is attached to the wall in the first mounting position for supporting the front wheel 16 perpendicular to the wall, the bottom rear wheel bracket 17 should be similarly attached to the wall in its first mounting position for supporting the rear wheel 18 perpendicular to the wall.

Also, when the top bracket 15 is attached to the wall in the second mounting position for supporting the front wheel angularly from the wall. The bottom rear wheel bracket 17 should be similarly attached to the wall in its second mounting position angularly from the wall.

The top bracket 17 may be attached to the vertical wall 14 in its first mounting position for supporting the front wheel perpendicular to the wall and the bottom bracket 17 may be attached to the wall in its second mounting position for supporting the rear wheel angularly from the wall. Similarly the top bracket 15 may be attached to the wall for supporting the front wheel angularly from the wall and the lower bracket attached to the wall for supporting the rear wheel perpendicular to the wall.

Figure 12:
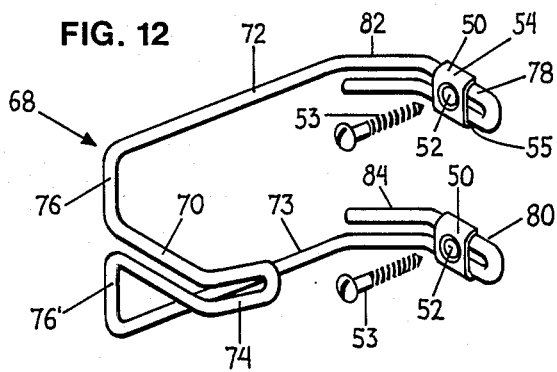
FIG. 12 is a perspective view of an alternate embodiment for the top front wheel bracket of the bicycle storage rack, also embodying the principles of this invention.

Referring now to FIG. 12, an alternate embodiment is shown for a top front wheel bracket indicated generally by the reference numeral 68, and embodying the principles of the invention. The front wheel bracket 68 includes a forward bearing means 70, an upper side bar 72 spaced above a lower side bar 73, and a side member 74, laterally spaced from the upper and lower side bars 72, 73. Connecting means 76, 76' integrally connect respectively the upper and lower side bars 72, 73 to the bearing means 70. The forward bearing means 70 is positioned vertically between the upper and lower side bars 72, 73. The front wheel 16 of the bicycle 12 is positioned between the upper and lower side bars 72, 73 and the side member 74, with the rim 26 of the front wheel abutting the forward bearing means 70.

Figure 4:
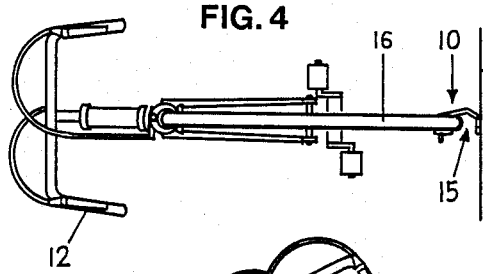
FIG. 4 is a top view of the bicycle supported on the rack substantially perpendicular to the wall.
Figure 5:
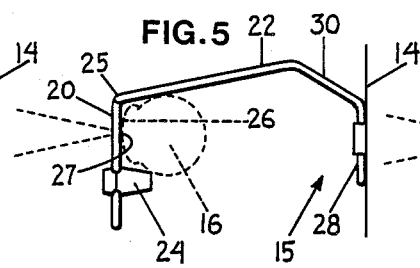
FIG. 5 is a top view of the top front wheel bracket of the bicycle rack mounted to a vertical wall, for supporting the front wheel of the bicycle substantially perpendicular to the wall as illustrated in FIG. 4, and showing the front wheel and rim in phantom inside the upper bracket.
Figure 6:
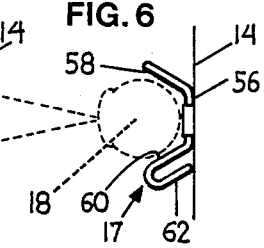
FIG. 6 is a top view of the bottom rear wheel bracket of the bicycle support rack used with the bracket in FIG. 5 for supporting the rear wheel of the bicycle substantially perpendicular to the wall, and showing the rear wheel in phantom inside the lower bracket.

The top front wheel bracket 68 further includes a first upper mounting member 78 and a first lower mounting member 80 for attaching the front wheel bracket 68 to the wall 14 in a first mounting position for vertically supporting the front wheel 16 perpendicular to he wall (FIG. 4). The first mounting members 78, 80 are substantially parallel to the forward bearing mean 70. When the mounting members 78, 80 are secured to the wall 14, the forward bearing means 70 is substantially parallel to the wall 14.

A second upper mounting member 82 and a second lower mounting member 84 may be used for attaching the top front wheel bracket 68 to the wall in a second mounting position for supporting the front wheel 16 angularly from the wall (FIG. 7). The second upper mounting member 82 is obliquely and integrally attached at one end to the first upper mounting member 78 and obliquely and integrally attached at the opposite end to the upper side bar 72. Similarly, the second lower mounting member 84 is obliquely and integrally attached at one end to the first lower mounting member 80 and obliquely and integrally attached at the opposite end to the lower side bar 73. When the second upper and lower mounting members 82,84 are secured to the wall, the forward bearing means 70 the upper and lower side bars 22,23 and the side member 74 are inclined with respect to the wall at an angle less than 90 degrees. Thus, in the second mounting position, the front wheel bracket 68 supports the front wheel obliquely from the wall.

As can be seen from FIG. 12 the top front wheel bracket 68 is also formed from a single wire 86.

Various modifications of the invention of a bicycle support rack described herein are within the spirit and scope of the invention, the scope of which is limited solely and defined by the appended claims.

I claim:

1. A bicycle rack including a front wheel bracket for securing to a vertical wall, and said front wheel bracket comprising:
    a bearing means for contacting the rim of the front wheel of the bicycle;
    a first side means secured to the bearing means;
    a second side means secured to the bearing means spaced from the first side means for receiving the front wheel between the first and second side means when the rim is contacting the bearing means, said second side means being adjustable along the bearing means for varying the lateral distance between the first side means and the second side means;
    a first mounting means for securing the bracket to the wall to support the bicycle in the vertical direction substantially perpendicular to the wall; and
    a second mounting means for securing the bracket to the wall to support the bicycle in the vertical direction angled from the wall.

2. The bicycle rack of claim 1, wherein said bearing means includes a first rod spaced above a second rod and parallel to each other.

3. The bicycle rack of claim 2, wherein said adjustable second side means includes:
    a tubular member having an outer end with a hole formed therein;
    a lateral opening extends through the tubular member and in communication with said hole to receive the said first and second rods;
    a threaded aperture is formed inside the tubular member in communication with the lateral opening; and
    a screw having an outer head for inserting in said end hole and extending through the space between the rods of the bearing means to threadedly engage the aperture for tightly abutting said head of the screw against said rods of the bearing means.

4. The bicycle of claim 1, includes:
    attaching means for securing the first mounting means to the wall to support the bicycle substantially perpendicular to the wall or securing the second mounting means to the wall to support the bicycle angled from the wall.

5. A bicycle rack including a front wheel bracket for securing to a vertical wall and a rear wheel bracket for securing to said vertical wall spaced below the front wheel bracket, said front wheel bracket comprising:
    a bearing means for contacting the rim of the front wheel of the bicycle;
    a first side means secured to the bearing means;
    a second side means secured to the bearing means spaced from the first side means for receiving the front wheel between the first and second side means when the rim is contacting the bearing means;
    a first mounting means for securing the bracket to the wall to support the bicycle in the vertical direction substantially perpendicular to the wall; and
    a second mounting means for securing the bracket to the wall to support the bicycle in the vertical direction angled to the wall; and
    said rear wheel bracket comprising:
    a contact means for contacting the outer edge of the rear wheel of the bicycle;
    a first side support extending outward from one end of the contact means;
    a second side support extending outward from the opposite end of the contact means, said rear wheel being positioned between said side supports when the bicycle is supported in the rack;
    said contact means including means for mounting the rear wheel bracket to the wall when the bicycle is stored in the vertical direction substantially perpendicular to the wall; and
    one of said side supports including a second means for mounting the rear wheel bracket to the wall when the bicycle is stored in the vertical direction angled less than 90 degrees from the wall.

6. The bicycle rack of claim 5, wherein each of said side supports is angled more than 90 degrees from said contact means.

7. The bicycle rack of claim 5, wherein said second means for mounting the rear wheel bracket includes:
    an upper bar spaced from a lower bar, said bars being opposed to and spaced from said one side support;
    connecting means connecting said one side support with said bars; and
    attaching means extending through the space between said upper and lower bars for securing the rear wheel bracket to the wall.

8. The bicycle rack of claim 7, wherein said attaching means includes:
    a channel member positioned on said upper bar and said lower bar, said channel member having an opening therethrough and in communication with the space between the upper and lower bars; and
    a screw extending through said channel opening for securing the rear wheel bracket to the wall, said screw having a head for abutting the channel member when the bracket is secured to the wall.

9. The rear wheel bracket of the bicycle rack of claim 5, wherein said first side support is positioned spaced from said second side support, so that the lateral distance therebetween increases further away from the contact means.

10. A bicycle rack including a front wheel bracket for securing to a vertical wall, and said front wheel bracket comprising:
    a bearing means for contacting the rim of the front wheel of the bicycle;
    a first side means secured to the bearing means;
    a second side means secured to the bearing means spaced from the first side means for receiving the front wheel between the first and second side means when the rim is contacting the bearing means;

a first upper mounting member and a first lower mounting member for securing the bracket to the wall to support the bicycle in the vertical direction substantially perpendicular to the wall, said first upper and lower mounting members being substantially parallel to the bearing means, each of said first mounting members including a pair of sections vertically spaced apart and aligned with each other, said bearing means being positioned forward from said mounting means and vertically positioned between said first upper mounting member and said first lower mounting member; and a second mounting means for securing the bracket to the wall to support the bicycle in the vertical direction angled from the wall.

11. A bicycle rack including a front wheel bracket for securing to a vertical wall, and said front wheel bracket comprising:

a bearing means for contacting the rim of the front wheel of the bicycle;

a first side means secured to the bearing means;

a second side means secured to the bearing means spaced from the first side means for receiving the front wheel between the first and second side means when the rim is contacting the bearing means;

a first mounting means for securing the bracket to the wall to support the bicycle in the vertical direction substantially perpendicular to the wall; and a second upper mounting member and a second lower mounting member for securing the bracket to the wall to support the bicycle in the vertical direction angled from the wall, said second mounting member being angularly positioned with respect to said bearing means and said first mounting means, each of said second mounting members including a pair of sections vertically spaced apart and aligned with each other, said bearing means being positioned forward from said mounting means and vertically positioned between said second upper and lower mounting members.

12. A bicycle rack including a front wheel bracket for securing to a vertical wall, said front wheel bracket comprising:

a single wire formed to provide an intermediate loop between the ends of the wire, an upper end loop, a lower end loop, and wide portions between said intermediate loop and said end loops;

said intermediate loop including an upper section spaced above a lower section to define a bearing means for contacting the rim of the front wheel of the bicycle;

said upper end loop having a first upper part and a second upper part angled from said first upper part;

said lower end loop having a first lower part and a second lower part angled from said lower first part, said first upper part and said first lower part defining a first mounting means for securing the bracket to the wall to support the bicycle in the vertical direction substantially perpendicular to the wall, said second upper part and said second lower part defining a second mounting means for securing the bracket to the wall to support the bicycle in the vertical direction angled from the wall;

said wire portions between said loops providing a first side support for said bracket; and a second side support spaced from said wire portions and secured to said intermediate loop for receiving the front wheel between the first and second side supports when the rim of the front wheel contacts the intermediate loop.

13. In a bicycle rack having a front wheel bracket for supporting the front wheel of the bicycle and a rear wheel bracket for supporting the rear wheel of the bicycle, said rear wheel bracket comprising:

a contact means for contacting the outer edge of the rear wheel of the bicycle;

a first side support extending outward from one side of the contact means;

a second side support extending outward from the opposite end of the contact means, said rear wheel being positioned between said side supports when the bicycle is supported in said rack;

said contact means including means for mounting the rear wheel bracket to the wall when the bicycle is stored in the vertical direction substantially perpendicular to the wall; and one of said side supports including a second means for mounting the rear wheel bracket to the wall when the bicycle is stored in the vertical direction angled less than 90 degrees from the wall.

14. The rear wheel bracket of claim 13, wherein said first side support is spaced from said second side support and angled away from each other, so that the lateral distance therebetween increases further away from the contact means.

15.
A bicycle rack including a front wheel bracket for securing to a vertical wall, and said front wheel bracket comprising:

a bearing means for contacting the rim of the front wheel of the bicycle;

a first side means secured to the bearing means;

a second side means secured to the bearing means spaced from the first side means for receiving the front wheel between the first and second side means when the rim is contacting the bearing means;

a first mounting means for securing the bracket to the wall to support the bicycle in the vertical direction substantially perpendicular ot the wall; and a second mounting means for securing the bracket to the wall to support the bicycle in the vertical direction angled from the wall, each of said mounting means including an upper mounting section and a lower mounting section spaced apart from each other;

a channel member positioned on the corresponding said upper member section and lower member section, said channel member having an opening therethrough and in communication with the space between the upper and lower sections bars; and a screw extending through said channel opening for securing the front wheel bracket to the wall, said screw having a head for abutting the channel member when the front wheel bracket is secured to the wall.

* * * * *